E. F. COLLINS.
DYNAMO ELECTRIC MACHINE.
APPLICATION FILED MAR. 16, 1914.
1,172,944.
Patented Feb. 22, 1916.
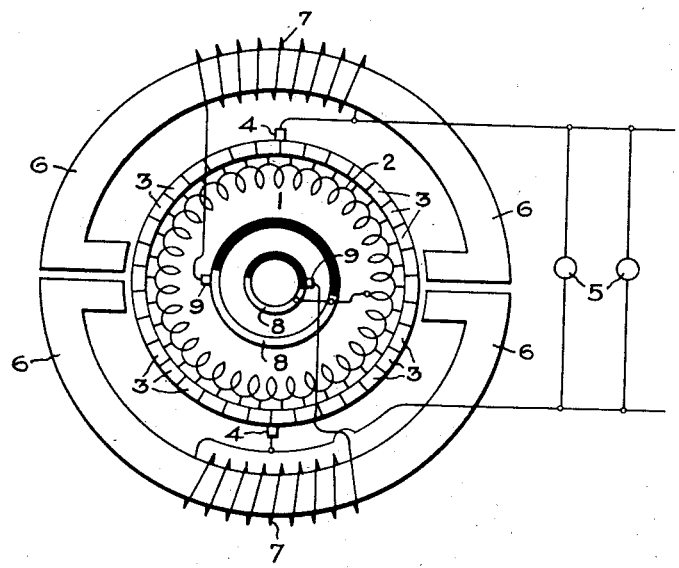
WITNESSES
INVENTOR:
EDGAR F COLLINS,
BY
HIS ATTORNEY.

UNITED STATES PATENT OFFICE.

EDGAR F. COLLINS, OF SCHENECTADY, NEW YORK, ASSIGNOR TO GENERAL ELECTRIC COMPANY, A CORPORATION OF NEW YORK.

DYNAMO-ELECTRIC MACHINE.

1,172,944.        Specification of Letters Patent.       Patented Feb. 22, 1916.

Application filed March 16, 1914. Serial No. 824,865.

*To all whom it may concern:*

Be it known that I, EDGAR F. COLLINS, a citizen of the United States, residing at Schenectady, in the county of Schenectady, State of New York, have invented certain new and useful Improvements in Dynamo-Electric Machines, of which the following is a specification.

My invention relates to dynamo electric machines and more particularly to direct current dynamo electric machines, and has for its object a novel arrangement of parts whereby such machines generate a constant voltage independent of their speed.

It is well known that the apparent resistance or impedance of an inductive circuit depends upon the frequency of the pulsations or alternations of the current therein, that is, the higher the frequency the higher the impedance. If the circuit is highly inductive, or in other words, its inductance is high compared to its resistance, the impedance increases substantially in direct proportion to the frequency of the current flowing therethrough. In such a circuit therefore, with substantially the same maximum voltage applied, the current will decrease as its frequency increases. My invention utilizes this principle, and consists in a direct current dynamo electric machine having a field magnet structure divided into a plurality of parts, two of which form each pole, each part having a field winding supplied with pulsating current, the frequency of which is proportional to the speed of the armature of the machine. I preferably derive this pulsating current from the armature winding of the machine.

Other features of novelty which characterize my invention are pointed out with particularity in the claims annexed to and forming a part of this specification. For a better understanding of my invention however, reference may be had to the following description taken in connection with the accompanying drawing in which the single figure shows diagrammatically one embodiment of my invention.

In the drawing, 1 is an armature of a direct current dynamo electric machine having an armature winding 2 connected to the bars 3 of a commutator on which brushes 4 bear. These brushes may be connected to an external circuit, across which are connected translating devices 5, such as lamps. The machine is provided with a field magnet structure divided into a plurality of parts 6, each field pole being formed by two of the parts. Each part of the field magnet structure is provided with a field winding 7 which is supplied with pulsating current, the frequency of the pulsations of which is proportional to the speed of the armature. I preferably derive this pulsating current from the armature winding 2 by collecting means between which and the brushes 4 the field windings are connected. This collecting means may comprise two semi-circular collector rings 8, on which brushes 9 bear, the field windings being connected between these brushes and the brushes 4. The pulsating current in the field windings produces pulsating fluxes in the parts of the field magnet, and I preferably arrange or position the collecting means so that the field windings are connected to the collecting means alternately whereby when the flux is a maximum in one part of the field structure it is zero in the other part forming a field pole of the machine. In the drawing I have illustrated a two pole machine having both collector rings connected to the same point on the armature winding, but it is evident that the machine may have any even number of poles.

The operation of the two pole machine which is illustrated in the drawing, is as follows: The rotation of the armature generates during one-half of each revolution a voltage between one of the brushes 9 and one of the brushes 4, which is first equal to half the voltage between the brushes 4, then rises to a maximum, and then decreases again to its first value. At the same time, the other of the brushes 9 is not in contact with its collector ring, so that no voltage is being generated between it and its corresponding brush 4. During the second half of each revolution, a voltage is generated between this brush 9 and the corresponding brush 4 which is first equal to half the voltage between the brushes 4, then rises to a maximum, and then decreases again to its first value. It will thus be seen that since the field windings 7 are connected between the brushes 9 and 4, that during each half of each revolution a voltage which varies from a mean value to a maximum and then to a mean value again is impressed upon one field winding while during the same half of each revolution no voltage is impressed on the other field winding, and during the second half of each revolution no voltage is impressed on the first field winding while during this half of each revolution a voltage which varies from a mean value to a maximum and then to a mean value again is impressed upon the second field winding. In other words, each field winding has impressed upon it a combination of pulsating and interrupted voltages, which causes a pulsating current to flow therethrough which in turn sets up a pulsating flux in each half of the field magnet structure. Because of the arrangement of the collector rings described above, the pulsating current and flux in one half of the field magnet is a maximum when the current and flux in the other half is zero, and vice versa. Therefore, the total flux in each pole is the arithmetical sum of the fluxes set up in both parts of the field structure and is substantially continuous.

The field winding circuit is highly inductive and consequently its impedance increases substantially in direct proportion to the frequency of the current flowing therethrough. The frequency of the current flowing through the field windings is proportional to the speed of the armature, as pointed out above, and therefore the current in each of these windings and the flux set up by each of them will decrease in a ratio substantially inversely proportional to the increase in speed of the armature. Since the total flux per pole is substantially continuous and varies inversely with the speed of the armature, the voltage between the brushes 4 will be substantially continuous and constant in value.

I desire it to be understood that my invention is not limited to the particular arrangement shown and described, and I aim in the appended claims to cover all modifications which do not depart from the spirit and scope of my invention.

What I claim as new and desire to secure by Letters Patent of the United States, is:—

1. A dynamo electric machine comprising an armature having an armature winding, a commutator connected thereto, and brushes bearing on said commutator, a field magnet structure divided into a plurality of parts, each pole being formed by two of said parts, a field winding on each of said parts, each field winding adapted to produce flux in only one part of each pole, and means for supplying a pulsating current to said field windings, the frequency of the pulsations being proportional to the speed of the armature.

2. A dynamo electric machine comprising an armature having an armature winding, a commutator connected thereto, and brushes bearing on said commutator, a field magnet structure divided into a plurality of parts, each pole being formed by two of said parts, a field winding on each of said parts, each field winding adapted to produce flux in only one part of each pole, and means for deriving a pulsating current from said armature, said field windings being connected to said means.

3. A dynamo electric machine comprising an armature having an armature winding, a commutator connected thereto, and brushes bearing on said commutator, a field magnet structure divided into a plurality of parts, each pole being formed by two of said parts, a field winding on each of said parts, each field winding adapted to produce flux in only one part of each pole, and means for deriving a pulsating current from said armature, said field windings being connected between said means and said brushes.

4. A dynamo electric machine comprising an armature having an armature winding, a commutator connected thereto, and brushes bearing on said commutator, a field magnet structure divided into a plurality of parts, each pole being formed by two of said parts, a field winding on each of said parts, each field winding adapted to produce flux in only one part of each pole, and collecting means for deriving a pulsating current, said means being connected to said armature winding, said field windings being connected to said collecting means.

5. A dynamo electric machine comprising an armature having an armature winding, a commutator connected thereto, and brushes bearing on said commutator, a field magnet structure divided into a plurality of parts, each pole being formed by two of said parts, a field winding on each of said parts, each field winding adapted to produce flux in only one part of each pole, and collecting means for deriving a pulsating current, said collecting means being connected to said armature winding, said field windings being connected between said collecting means and said brushes.

6. A dynamo electric machine comprising an armature having an armature winding, a commutator connected thereto, and brushes bearing on said commutator, a field magnet structure divided into a plurality of parts, each pole being formed by two of said parts, a field winding on each of said parts, semi-circular collecting rings connected to said armature winding and brushes bearing thereon, said field windings being connected between said brushes on said collecting rings and said brushes on the commutator.

7. A dynamo electric machine comprising an armature having an armature winding a commutator connected thereto, brushes bearing on said commutator, a field magnet structure divided into two parts, each pole being formed by said parts, a field winding on each of said parts, semi-circular collecting rings connected to said armature winding and brushes bearing thereon, each of said field windings being connected to a brush upon one of said collecteor rings and a brush on said commutator.

8. A dynamo electric machine comprising an armature having an armature winding, a commutator connected thereto, and brushes bearing on said commutator, a field magnet structure divided into a plurality of parts, each pole being formed by two of said parts, a field winding on each of said parts, and means for supplying pulsating currents to said field windings alternately the frequency of the pulsations being proportional to the speed of the armature, the pulsating currents producing pulsating fluxes in each of the parts of the field magnet structure.

9. A dynamo electric machine comprising an armature having an armature winding, a commutator connected thereto, and brushes bearing on said commutator, a field magnet structure divided into a plurality of parts, each pole being formed by two of said parts, a field winding on each of said parts, and means for deriving a pulsating current from said armature, said field windings being connected to said means alternately, the pulsating currents producing pulsating fluxes in each of the parts of the field magnet structure.

10. A dynamo electric machine comprising an armature having an armature winding, a commutator connected thereto, and brushes bearing on said commutator, a field magnet structure divided into a plurality of parts, each pole being formed by two of said parts, a field winding on each of said parts, and means for deriving a pulsating current from said armature, said field windings being connected between said means and said brushes alternately, the pulsating currents producing pulsating fluxes in each of the parts of the field magnet structure.

11. A dynamo electric machine comprising an armature having an armature winding, a commutator connected thereto, and brushes bearing on said commutator, a field magnet structure divided into a plurality of parts, each pole being formed by two of said parts, a field winding on each of said parts, and collecting means for deriving a pulsating current, said means being connected to said armature winding, said field winding being connected to said collecting means alternately, the pulsating currents producing pulsating fluxes in each of the parts of the field magnet structure.

12. A dynamo electric machine comprising an armature having an armature winding, a commutator connected thereto, and brushes bearing on said commutator, a field magnet structure divided into a plurality of parts, each pole being formed by two of said parts, a field winding on each of said parts, and collecting means for deriving a pulsating current, said collecting means being connected to said armature winding, said field windings being connected between said collecting means and said brushes alternately, the pulsating currents producing pulsating fluxes in each of the parts of the field magnet structure.

13. A dynamo electric machine comprising an armature having an armature winding, a commutator connected thereto, and brushes bearing on said commutator, a field magnet structure divided into a plurality of parts, each pole being formed by two of said parts, a field winding on each of said parts, semi-circular collecting rings connected to said armature winding and brushes bearing thereon, whereby pulsating currents are derived from said armature winding, said field windings being connected between said brushes on said collecting rings and said brushes on the commutator alternately, the pulsating currents producing pulsating fluxes in each of the parts of the field magnet structure.

14. A dynamo electric machine comprising an armature having an armature winding, a commutator connected thereto, brushes bearing on said commutator, a field magnet structure divided into two parts, each pole being formed by said parts, a field winding on each of said parts, semi-circular collecting rings connected to said armature winding, and brushes bearing thereon, whereby pulsating currents are derived from said armature winding, said field windings being connected between said brushes on said collector rings and said brushes on said commutator alternately, the pulsating currents producing fluxes in each of the parts of the field magnet structure.

In witness whereof, I have hereunto set my hand this 14th day of March, 1914.

EDGAR F. COLLINS.

Witnesses:
BENJAMIN B. HULL,
HELEN ORFORD.